United States Patent
Moore et al.

(10) Patent No.: US 9,906,558 B2
(45) Date of Patent: Feb. 27, 2018

(54) USER MANAGED ACCESS SCOPE SPECIFIC OBLIGATION POLICY FOR AUTHORIZATION

(71) Applicant: International Business Machines Corporation, Armonk, NY (US)

(72) Inventors: David P. Moore, Robina (AU); Craig Pearson, Varsity Lakes (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/748,300

(22) Filed: Jun. 24, 2015

(65) Prior Publication Data

US 2016/0381021 A1   Dec. 29, 2016

(51) Int. Cl.
  *H04L 29/06* (2006.01)
(52) U.S. Cl.
  CPC ............ *H04L 63/20* (2013.01); *H04L 63/102* (2013.01); *H04L 63/0838* (2013.01)
(58) Field of Classification Search
  CPC ......... H04L 67/12; H04L 63/10; H04L 63/08; H04L 63/20; H04L 63/12; H04L 63/09
  USPC .......................................................... 726/1
  See application file for complete search history.

(56) References Cited

U.S. PATENT DOCUMENTS

| | | | |
|---|---|---|---|
| 8,776,204 B2 | 7/2014 | Faynberg et al. | |
| 9,552,444 B2 | 1/2017 | Smith et al. | |
| 9,628,475 B2 | 4/2017 | Gupta | |
| 2004/0062400 A1* | 4/2004 | Sovio | H04L 9/0827 380/286 |
| 2007/0016465 A1* | 1/2007 | Schaad | G06Q 10/06 705/7.15 |
| 2009/0132642 A1* | 5/2009 | Ortal | G06F 9/4445 709/203 |
| 2009/0187971 A1* | 7/2009 | Bao | H04L 65/105 726/3 |
| 2012/0047052 A1* | 2/2012 | Patel | G06Q 40/00 705/30 |
| 2012/0317624 A1* | 12/2012 | Monjas Llorente | H04L 63/105 726/4 |
| 2013/0086645 A1 | 4/2013 | Srinivasan et al. | |
| 2013/0318569 A1 | 11/2013 | Canning et al. | |
| 2014/0024341 A1* | 1/2014 | Johan | H04L 63/0884 455/411 |
| 2014/0033279 A1 | 1/2014 | Nimashakavi et al. | |

(Continued)

OTHER PUBLICATIONS

Maler, Eve, "Controlling Data Usage with User-Managed Access (UMA)", W3C Privacy and Data Usage Control Workshop, Oct. 2010, pp. 1-5.

(Continued)

*Primary Examiner* — Haresh N Patel
(74) *Attorney, Agent, or Firm* — Steven F. McDaniel; David B. Woycechowsky

(57) ABSTRACT

A method sends a request for a delegated authorization grant data set, receives a delegated authorization grant data set that defines the delegated authorization grant scope, with respect to a resource. The delegated authorization grant data set includes a scope variable value having been selected by a delegator entity through a delegation grant scope user interface on the delegator device. The scope controls access to the resource in a manner limited by the scope of the delegated authorization grant defined by the delegated authorization grant data set.

18 Claims, 7 Drawing Sheets

(56) References Cited

U.S. PATENT DOCUMENTS

| | | | |
|---|---|---|---|
| 2014/0075515 A1* | 3/2014 | McColgan | H04L 67/26 726/4 |
| 2014/0143836 A1 | 5/2014 | Fletcher et al. | |
| 2014/0164775 A1* | 6/2014 | Wu | H04L 63/0428 713/171 |
| 2014/0282986 A1* | 9/2014 | Leung | H04L 63/0807 726/9 |
| 2014/0337914 A1 | 11/2014 | Canning et al. | |
| 2014/0380429 A1* | 12/2014 | Matsugashita | H04L 63/0823 726/4 |
| 2015/0073955 A1* | 3/2015 | Gilman | G06Q 30/04 705/34 |
| 2016/0373442 A1 | 12/2016 | Bruch et al. | |

OTHER PUBLICATIONS

Maler et al., "User-Managed Access (UMA) Profile of OAuth 2.0", Kantara Initiative, Feb. 23, 2015, Editor: Thomas Hardjono, MIT, 42 pages.

"Join. Innovate. Trust", Kantara Initiative, © 2015 Kantara Initiative, provided by searcher in search report dated Dec. 20, 2014, 3 pages.

"OAuth", Wikipedia, the free encyclopedia, Apr. 6, 2015 at 20:38, 10 pages, <https://en.wikipedia.org/w/index.php?title=OAuth&oldid=655240840>.

\* cited by examiner

USER MANAGED ACCESS SCOPE SPECIFIC OBLIGATION POLICY FOR AUTHORIZATION

BACKGROUND

The present invention relates generally to the field of selectively authorizing users to access data, and more particularly to authorization systems and methods that provide for secure delegated access (for example, authorization under the Oauth standard).

The Wikipedia entry for "OAuth" (http://en.wikipedia.org/wiki/OAuth) currently states as follows: "OAuth is an open standard for authorization." OAuth provides client applications a 'secure delegated access' to server resources on behalf of a resource owner. It specifies a process for resource owners to authorize third-party access to their server resources without sharing their credentials . . . . OAuth is commonly used as a way for web surfers to log into third party web sites using their [other] accounts, without worrying about their access credentials being compromised."

In today's interconnected data and communication environment, a resource owner sometimes needs to delegate authorization to a third party application, such that the third party application can access the resource owner's data. However, in delegating authorization to the third party application, the resource owner does not wish to divulge their authorization credentials needed to access the resource.

An illustrative case is the ability to share a cloud based calendar. In such cases, it is common for the calendar data owner to consent to authorize a third party application or service upon receipt of an access request notification. The notification typically includes information about the requesting third party and the scope or permissions requested for access. The consent prompt may include options to approve or deny zero or more of the requested scopes before the consent is approved by the owner. Once the resource owner has consented, the requester is notified and then proceeds to obtain an access token. The access token represents the resource owner's delegated authorization to the requester, enabling access to the owner's calendar data. An authorization system typically defines message flow protocols (standard or non-standard) for these types of delegated authorization and data sharing cases.

SUMMARY

According to an aspect of the present invention, there is a method, computer program product and/or system that performs the following steps (not necessarily in the following order): (i) sending, from an authorization server module over a communication network to a delegator device, a request for a first delegated authorization grant data set; (ii) receiving, by the authorization server module over a communication network and from the delegator device, the first delegated authorization grant data set, with the first delegated authorization grant data set defining a scope of a first delegated authorization grant from the delegator device to a delegatee entity with respect to a first resource, with the first delegated authorization grant data set including a first scope variable value having been selected by a delegator entity through a delegation grant scope user interface on the delegator device; and (iii) controlling access to the first resource by the delegatee entity through the communication network in a manner limited by the scope of the first delegated authorization grant defined by the first delegated authorization grant data set.

DETAILED DESCRIPTION

Figure 1:
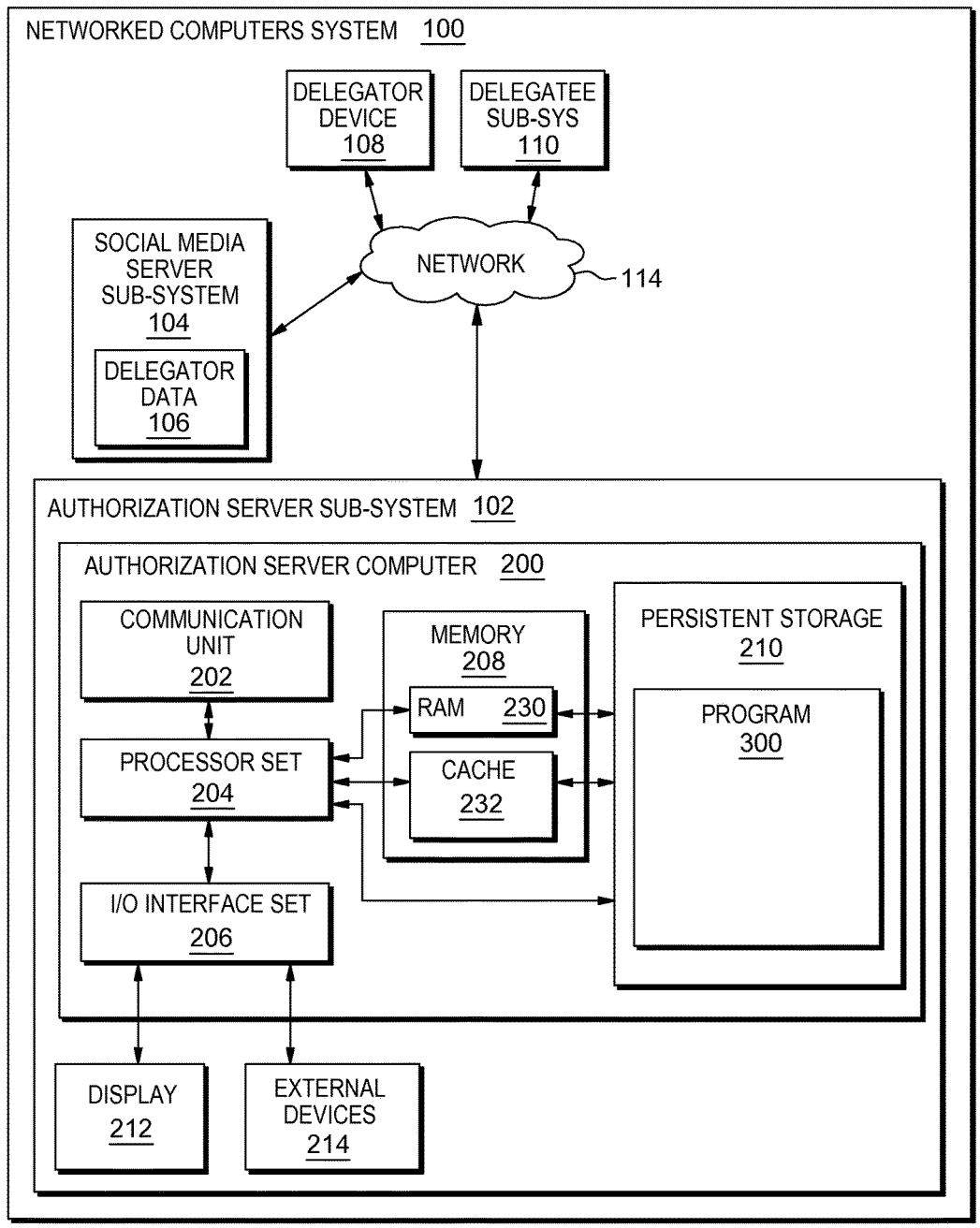
FIG. 1 is a block diagram view of a first embodiment of a system according to the present invention.

Some embodiments of the present invention give a resource owner relatively granular and/or robust control over delegated access authorization scope, and/or provide the resource owner an ability to specify and/or modify obligation policies within an authorization grant. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: authorization server sub-system 102; social media server sub-system 104 (including delegator data 106); delegator device 108; delegatee sub-system 110; communication network 114; authorization server computer 200; communication unit 202; processor set 204; input/output (I/O) interface set 206; memory device 208; persistent storage device 210; display device 212; external device set 214; random access memory (RAM) devices 230; cache memory device 232; and program 300. While this embodiment includes a "social media server sub system" any type of resource server could be used. For example, some embodiments of the present invention are applicable to enterprise resource data contexts.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
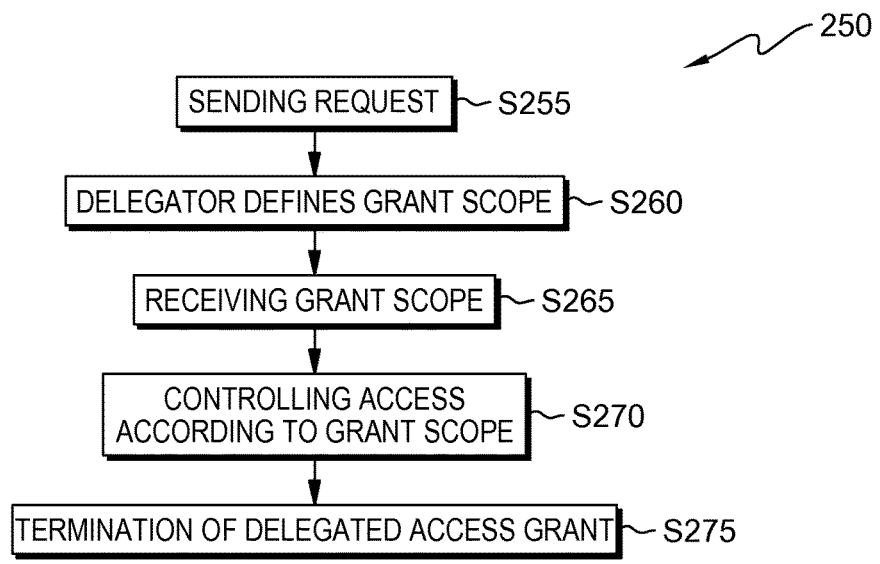
FIG. 2 is a flowchart showing a first embodiment method performed, at least in part, by the first embodiment system.
Figure 3:
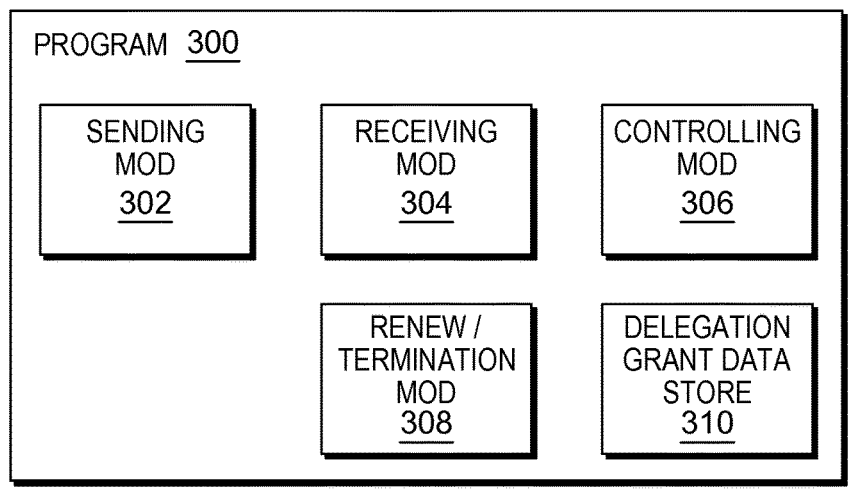
FIG. 3 is a block diagram showing a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Before the process of flowchart 250 begins, delegatee sub-system 110 determines that it wants to have delegated access to some of the delegator's non-publically available delegator data 106, which data is stored on social media server sub-system 104 (see FIG. 1). Accordingly, delegatee sub-system 110 sends a request for delegated access to authorization server sub-system 102. In some variations, this request may be sent directly from delegatee sub-system 110, through network 114, to authorization server sub-system 102. In other variations, delegatee sub-system 110 may communicate with delegator device 108 in order to get delegator device 108 to send a request, through network 114, to authorization server sub-system 102. In this example, delegatee sub-system 110 administers an application (app) that the delegator wants to use, but the use of the app is conditioned on the delegator granting delegated access to the delegatee with respect to some portion of the delegator's data 106 (for example, a list of contacts and associated email addresses) stored on social media server sub-system 104 (see FIG. 1).

Processing begins at operation S255, where, in response to receiving the request for delegated access, sending module ("mod") 302 of program 300 of authorization server sub-system sends a grant scope definition request to delegator device 108 (which, in this example, is a smart phone owned and controlled by the delegator, who is a human user). The reason for this request is that the delegator is being allowed an opportunity to permit the "scope" of the delegated access (see definition of "scope," below, in the Definitions sub-section of this Detailed Description section) in a relatively granular manner.

Processing proceeds to operation S260, where delegator, through delegator device 108 and network 114, makes a delegated authorization grant data set which defines the scope of the delegation grant to be made to the delegatee. More specifically, this delegated authorization grant data set is defined by the delegator through a delegation grant scope user interface which is implemented on delegator device 108 for communication with the delegator. In this embodiment, the delegator is a human user. Alternatively, the delegator may take the form of a software agent or the like. An example of a delegation grant scope user interface will be discussed, below, in the Further Comments And/Or Embodiments sub-section of this Detailed Description section. The delegated authorization grant data set defines the "scope" of the delegated access to be delegated by the delegator to the delegatee. The delegator device sends the delegated authorization grant data set through network 114 to authorization server sub-system 102 (see FIG. 1).

Processing proceeds to operation S265 where receiving mod 304 receives the delegated authorization grant data set and stores data defining the scope of the corresponding delegated access grant in delegation grant data store 310.

Processing proceeds to operation S270 where controlling mod 306 sends appropriate communications, through network 114, to social media server sub-system 104 and/or delegatee sub-system 110 to control delegated access of delegator data by delegatee sub-system 110 (see FIG. 1). More specifically, this access is controlled to be limited, conditioned and/or restricted according to the scope of the delegation grant as defined by the delegated authorization grant data set and effectively stored in delegation grant data store 310. In this example, the delegated access agreed to by the delegator is limited to a single access session, which is conducted under control of controlling mod 306.

Processing proceeds to operation S275 where renew/termination mod 308 terminates the delegated access grant upon the end of the access session conducted at operation S270. Alternatively, renew/termination module may give the delegator an opportunity to renew the delegated access grant at one, or more, of the following junctures: (i) immediately upon termination; (ii) upon receipt of a new request from the delegatee; and/or (iii) according to a predefined schedule.

III. Further Comments and/or Embodiments

Some embodiments of the present invention may include one, or more, of the following features, characteristics and/or advantages: (i) improves delegated access (for example, OAuth style delegated access) operation from a resource owner's point of view; (ii) enables improved understanding by a resource owner about access scopes for which consent is requested; (iii) allows a resource owner to grant conditional consent for some scopes; and/or (iv) allows a resource owner to grant unconditional consent for some scopes.

With respect to item (i) in the paragraph above, improvements in delegated access standards (for example, OAuth delegated access standards), according to some embodiments of the present disclosure are associated with a power imbalance which often exists in the relationship between a resource owner and an access requester. In conventional OAuth, a resource owner may consent to authorize "delegated access" (sometimes referred to herein as, simply, "access") for a third party, because the value of the service, application or convenience provided by the third party is difficult for the resource owner to refuse. Further, third party services often request the most permissive "scope of delegated access" (sometimes referred to herein as, simply, "scope") available because: (i) the most permissive scopes are the easiest option for the third party service to process; and/or (ii) the most permissive scopes are perceived, or considered to deliver, the best user experience. "Scope of delegated access" herein refers to the terms, conditions and/or rules which control various aspects of a grant of delegated access. The most permissive scopes can cause difficulties during consent. Some embodiments of the present disclosure give the parties more options and flexibility with respect to scope of delegated access, which may help avoid situations like those described in this paragraph.

Some embodiments of the present disclosure allow a resource owning end user to define scope specific obligation policies during, and after, an authorization consent grant. An example obligation policy is a one-time password mechanism. Some embodiments deny access to an authorized access token if the obligation policy fails. Further, some embodiments enable the resource owner to modify obligation policies for any authorized scope.

Some embodiments of the present invention may include one, or more, of the following features, characteristics and/or advantages: (i) improves resource owner access control over delegated access authorization scope; (ii) enables scope specific control; (iii) gives resource owner a view of how and when a delegated authorization is being used; (iv) enables a resource owner to assign different scope specific obligation policies for a given scope within the context of separate authorization consent grants; (v) allows a resource owner to modify scope specific obligation policies within an authorization grant (for example, a resource owner may choose to weaken or remove a scope specific obligation grant as they gain trust with an authorized resource consumer); (vi) addresses the concept of obligations for a user and/or requester; and/or (vii) triggers obligation policies even if the access requester is not the resource owner (for example, a resource owner can be "injected" into an access attempt to provide an asynchronous second factor authentication).

Figure 4:
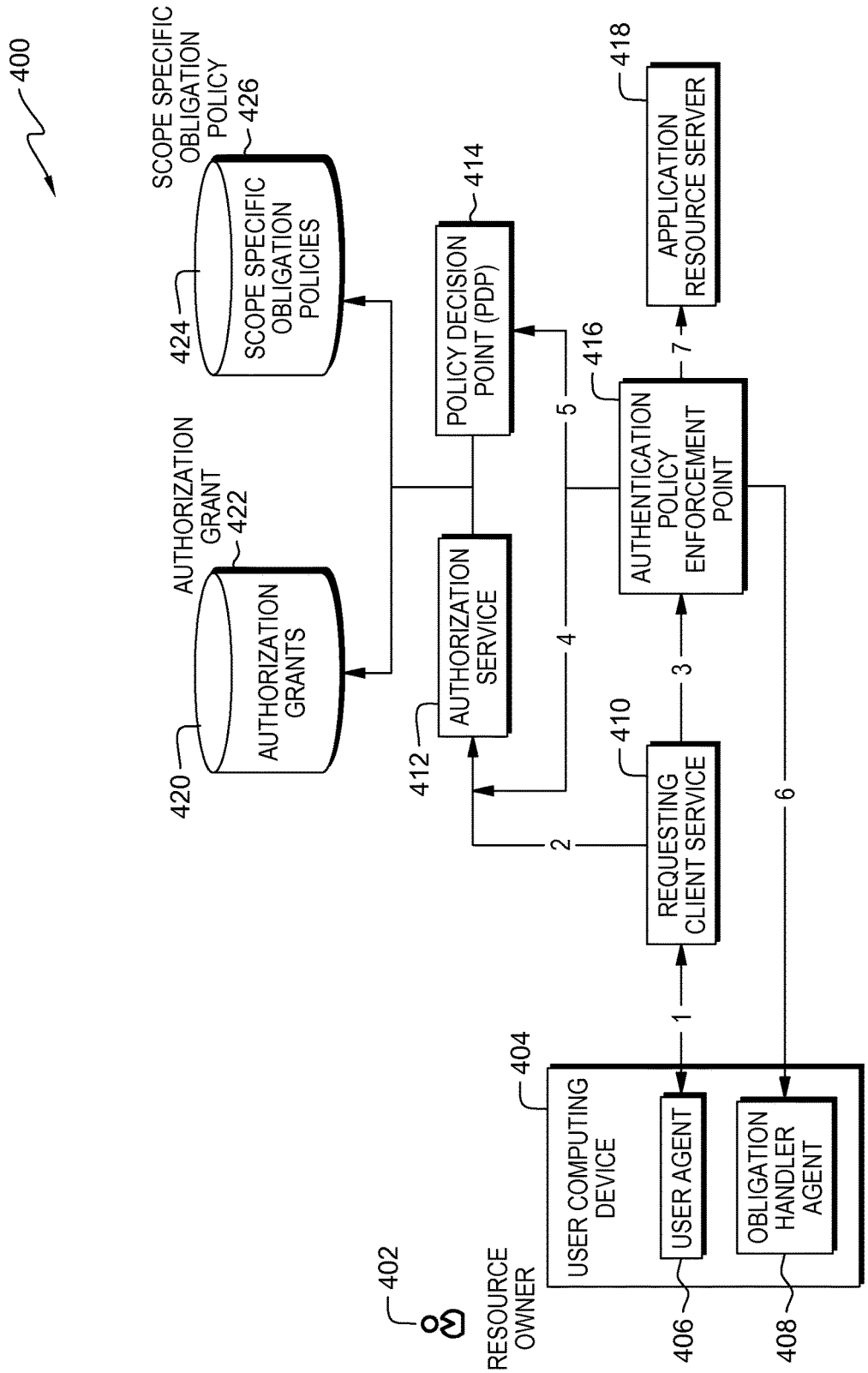
FIG. 4 is a block diagram showing components of a second embodiment system.

FIG. 4 shows delegated access authorization system 400 including: resource owner 402 (sometimes also referred to herein as the delegator); user computing device 404; user agent 406; obligation handler agent 408; requesting client service module 410 (sometimes herein referred to as the "delegatee"); authorization service mod 412; policy decision point mod 414; authentication policy enforcement point mod 416; application resource server 418; authorization grants data store 420; first authorization grant data set 422; scope specific obligation policies data store 424; and first scope specific obligation policy data set 426. In some embodiments: (i) user agent 406 might be considered a partner or distributed component of module 410; and/or (ii) agent 406 might receive the delegated access embodied by an access token.

Authorization system 400 shows main components of system for managing and controlling a user managed access (UMA) using a scope specific obligation policy. The assembly of the components of system 400 may vary depending on implementation and deployment options. With reference to FIG. 4, the main information flows between components of system 400 will now be described.

Resource owner 402 invokes a service of a web or mobile application through user agent 406 of user computing device 404 and remote requesting client service module 410. The service includes an integration with another service used by the resource owner. This integrated service (the "application resource service") is provided by application resource server 418.

Access to the application resource service of server 418 is authorized by the submission and validation of an OAuth access token. Requesting client service module 410 initiates an OAuth authorization code flow to obtain an access token. During this flow, resource owner 402 provides consent with scope specific obligation policy preferences, as will be discussed, below, in connection with screenshot 600 of FIG. 6, which shows an example of the displayed and submitted consent form.

With a valid access token, requesting client service module 410 attempts to access application resource server. This is done via a policy enforcement point (PEP) proxy. PEP module 416 validates the token with authorization server 412, 414, 420, 424. PEP module 416 requests policy decision point (PDP) module 414 to evaluate any applicable policies for the context of the current request and access token. If any user selected scope specific obligation policies are present, PDP module 414 informs PEP module 416 via a response. PEP module 416 then invokes resource owner's 402 registered obligation handler agent 408 of user computing device 404. Agent 408 notifies and collects obligation data from resource owner 402. An example obligation is an OTP (one time password) password authentication. The obligation data is then validated by the PDP module.

If the access token is valid and the obligation data has been validated by PDP module 414, then PEP module 416 will enable access by requesting client service module 410 to the applicable resource of resource owner 402 on application resource server 418.

Figure 5:
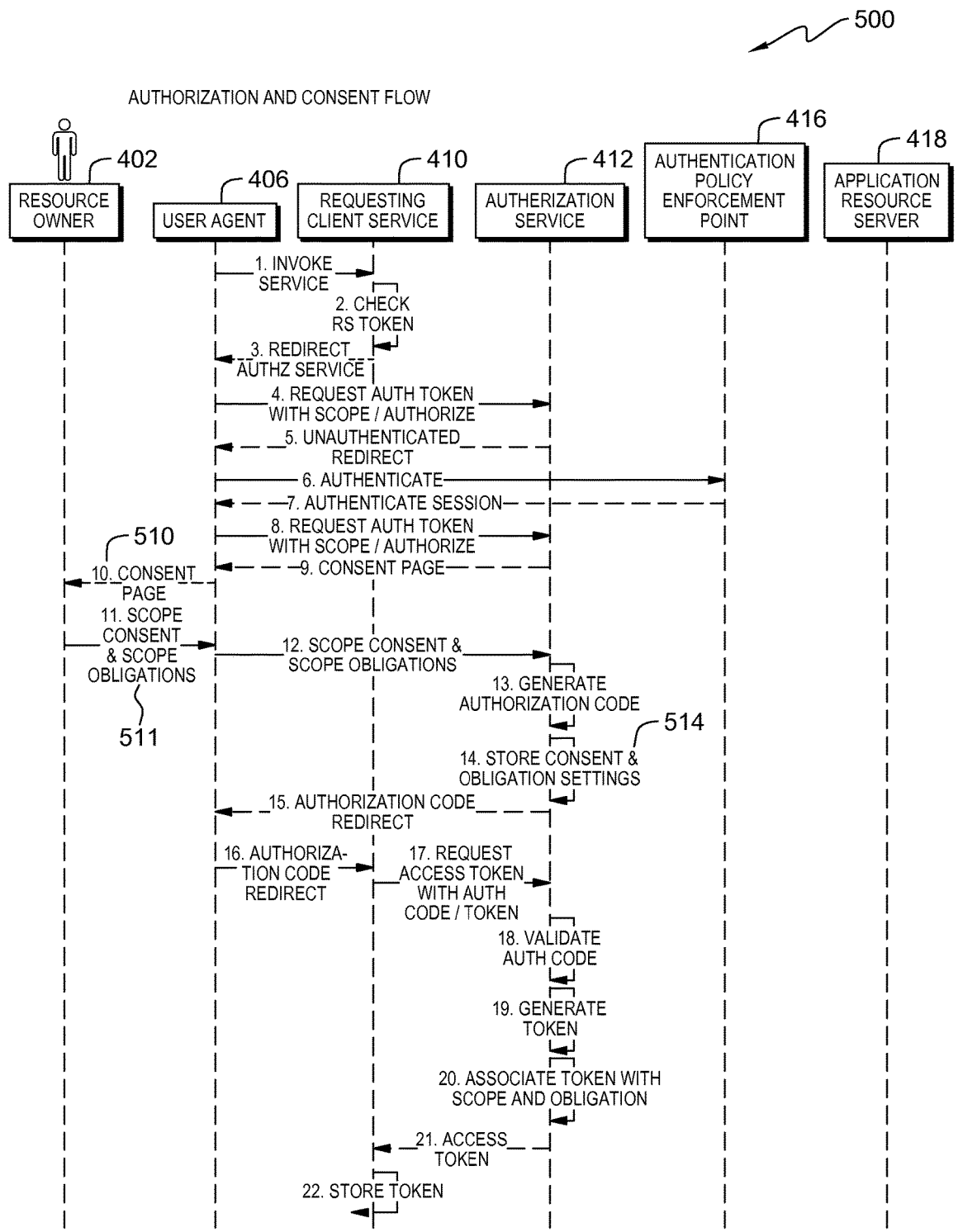
FIG. 5 is a flowchart of a second embodiment of a method according to the present invention.

There are two component flows which form a foundation of a solution design of an embodiment of the present disclosure are as follows: (i) flowchart 500 of FIG. 500; and (ii) flowchart 700 of FIG. 7. Flowchart 500 shows a component flow for authorization and consent and includes: (i) the following components: 402, 406, 410, 412, 416 and 418 (see also, FIG. 4); and (ii) the operations shown in FIG. 5, including the following operations: 510, 511 and 514. Flowchart 700 shows a component flow for requesting client service initiated access (that is, a form of delegated access) and includes: (i) the following components: 402, 408, 410, 412, 416, 414 and 418 (see also, FIG. 4); and (ii) the operations shown in FIG. 7, including the following operations: 706, 707, 710, 711, 714 and 715. More specifically: (i) flowchart 500 shows collection and storage of resource owner scope specific obligation policies (that is, delegated access policies) during an authorization code flow consent; and (ii) flowchart 700 shows enforcement of scope specific policy obligation during access token validation.

Certain portions of the delegated authorization and consent component and/or process flow of flowchart 500 are similar to conventional delegated authorization procedures (for example, conventional OAuth 2 authorization code flow). However, the method of flowchart 500 departs from conventional delegated authorization and consent in some ways which will now be discussed. Operation 510 represents an authorization consent form presented to resource owner 402. The authorization consent form includes options that allow resource owner 402 to select scope specific obligation policy 426 preferences. Refer to screenshot 600 of FIG. 6 which shows a screenshot of an example authorization consent form 602.

Operation 511 represents submission of authorization consent form 602 by resource owner 402. Submission of authorization consent form 602 constitutes an authorization consent grant, in accordance with the options selected by resource owner 402. The authorization consent grant defines, at least in part, scope specific obligation policy 426.

Operation 514 represents persistent storage of scope specific obligation policy 426 in scope specific obligation policies 424.

Figure 6:
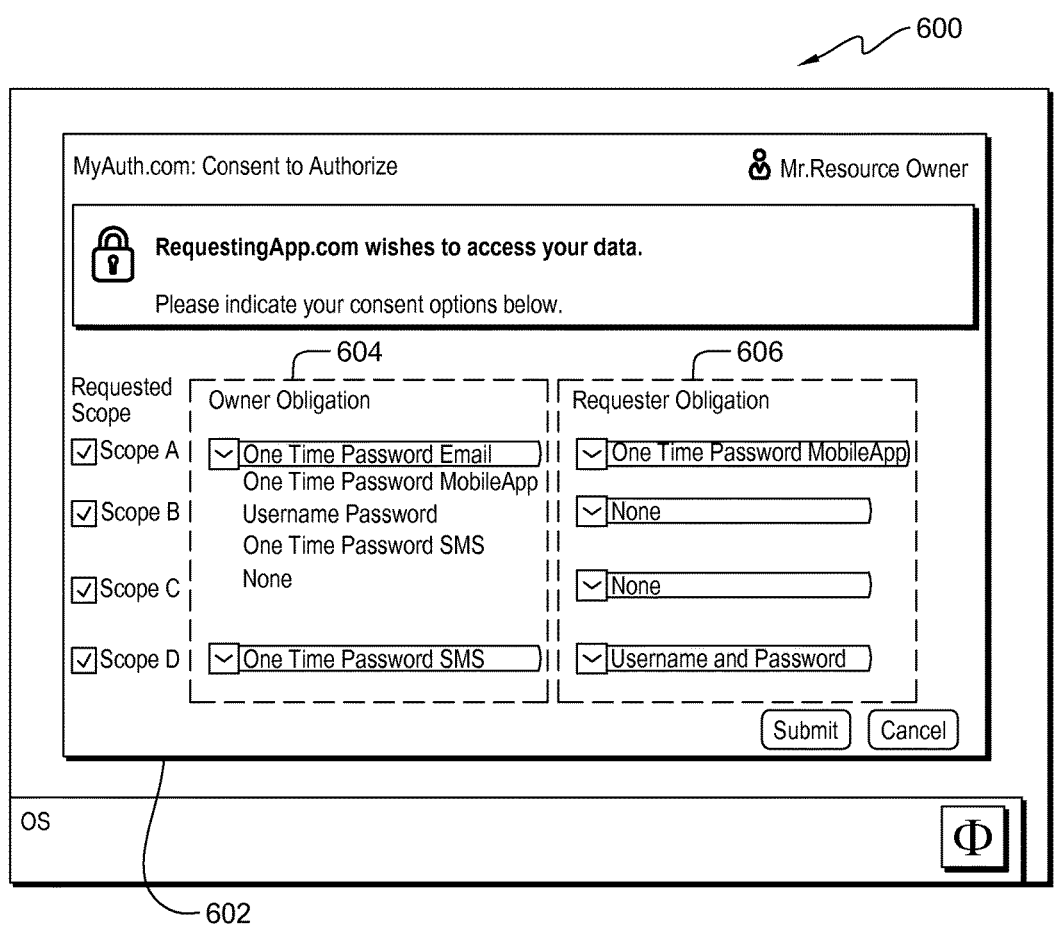
FIG. 6 is a screenshot view showing information that is generated by some embodiments of the present invention.

Screenshot 600 of FIG. 6 shows an example consent form 602 graphical user interface, for collection of resource owner 402 (see FIG. 4) scope specific obligation policies and consent during an authorization code flow as described above with reference to FIG. 5. Consent form 602 varies from a traditional authorization consent form in the following respects: (i) resource owner obligation selection 604 and/or (ii) requester obligation selection 606.

Figure 7:
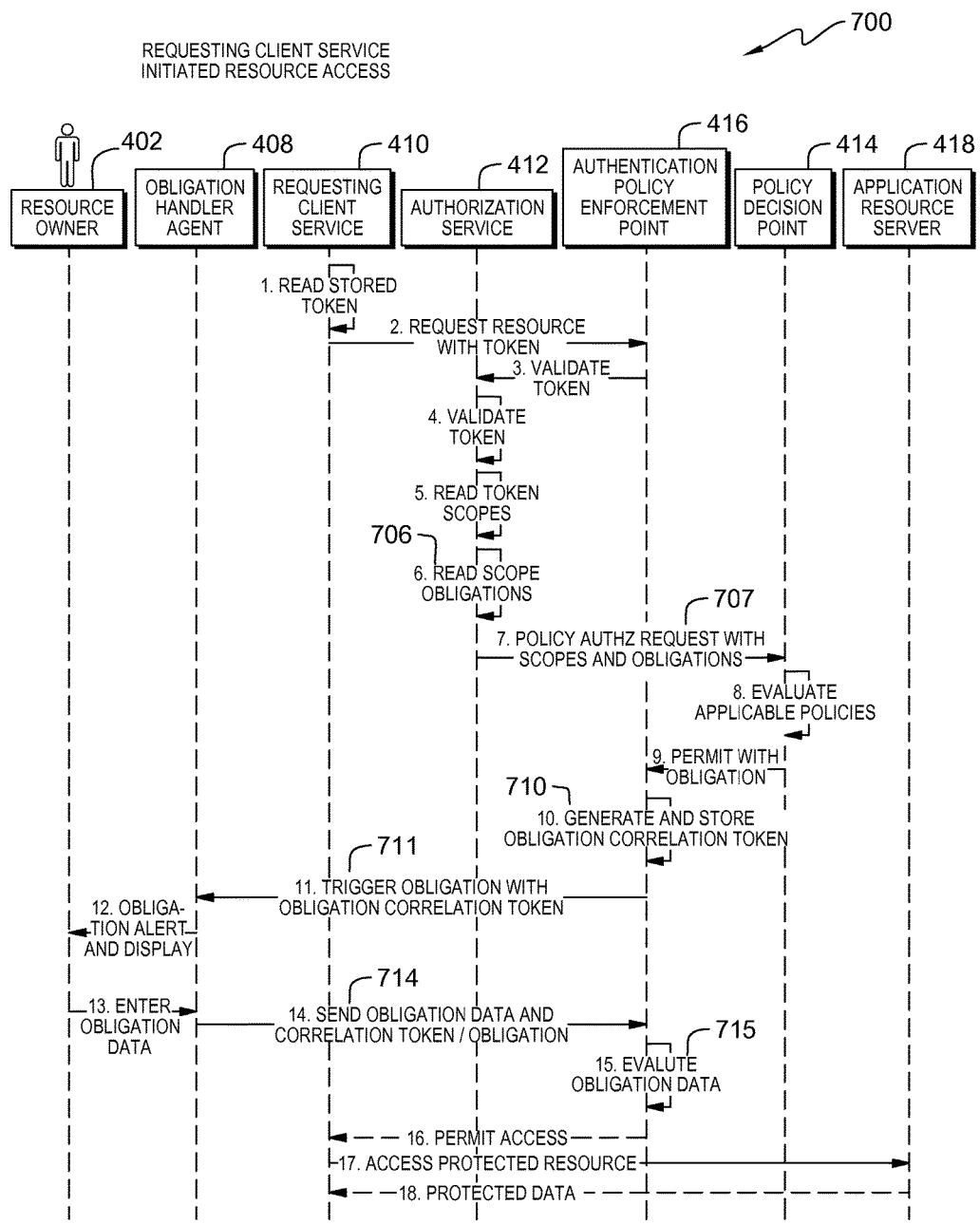
FIG. 7 is a flowchart of a third embodiment of a method according to the present invention.

Flowchart 700 of FIG. 7 illustrates enforcement of scope specific obligation policy 426 (not shown, refer to FIG. 4 above) during a resource access attempt, when the resource access attempt is initiated by requesting client service 410 using an access token, in some embodiments of the present invention. The flow is initiated by requesting client service 410 in possession of an authorized access token. Resource owner 402 is not necessarily present during flow initiation. Resource owner 402 is present during the policy enforcement steps (numbered steps 3 to 15, and especially steps 7, 8, 9 and 15).

Noteworthy flows in flowchart 700 of FIG. 7 are discussed in the following paragraphs.

Flows 706 and 707: During token validation, authorization service 412 reads obligation policy 426 (not shown, refer to FIG. 4 above) preferences (operation 706) associated with an authorization grant and includes them in an authorization request (not shown) that is sent to policy decision point 414 (operation 707).

Operation 710: Policy decision point 414 has indicated that an obligation must be completed. Policy decision point 414 invokes authentication policy enforcement point 416. Authentication policy enforcement point 416 generates a unique obligation correlation token (not shown) and stores it. The obligation correlation token is used to correlate an obligation response (not shown) in operation 714.

Operation 711: Authentication policy enforcement point 416 sends an obligation notification (not shown) to obligation handler agent 408 of resource owner 402. The notification includes the obligation mechanism (not shown) and the obligation correlation token (not shown). In some embodiments of the present invention, obligation handler agent 408 is an application on resource owner 402's mobile device, and delivers the notification via a mobile push notification service.

Operation 714: Obligation handler agent 408 sends the obligation data (not shown) and obligation correlation token (not shown) to the "/obligation" endpoint of authentication policy enforcement point 416. The obligation endpoint is a web server URL which can receive obligation data (for example, correlation token and one time password supplied by resource owner). The "/obligation" is meant to indicate a URL type endpoint syntax.

Operation 715: The obligation data is evaluated. In some instances, operation 715 invokes the policy decision point 414 for validation.

Figure 8:
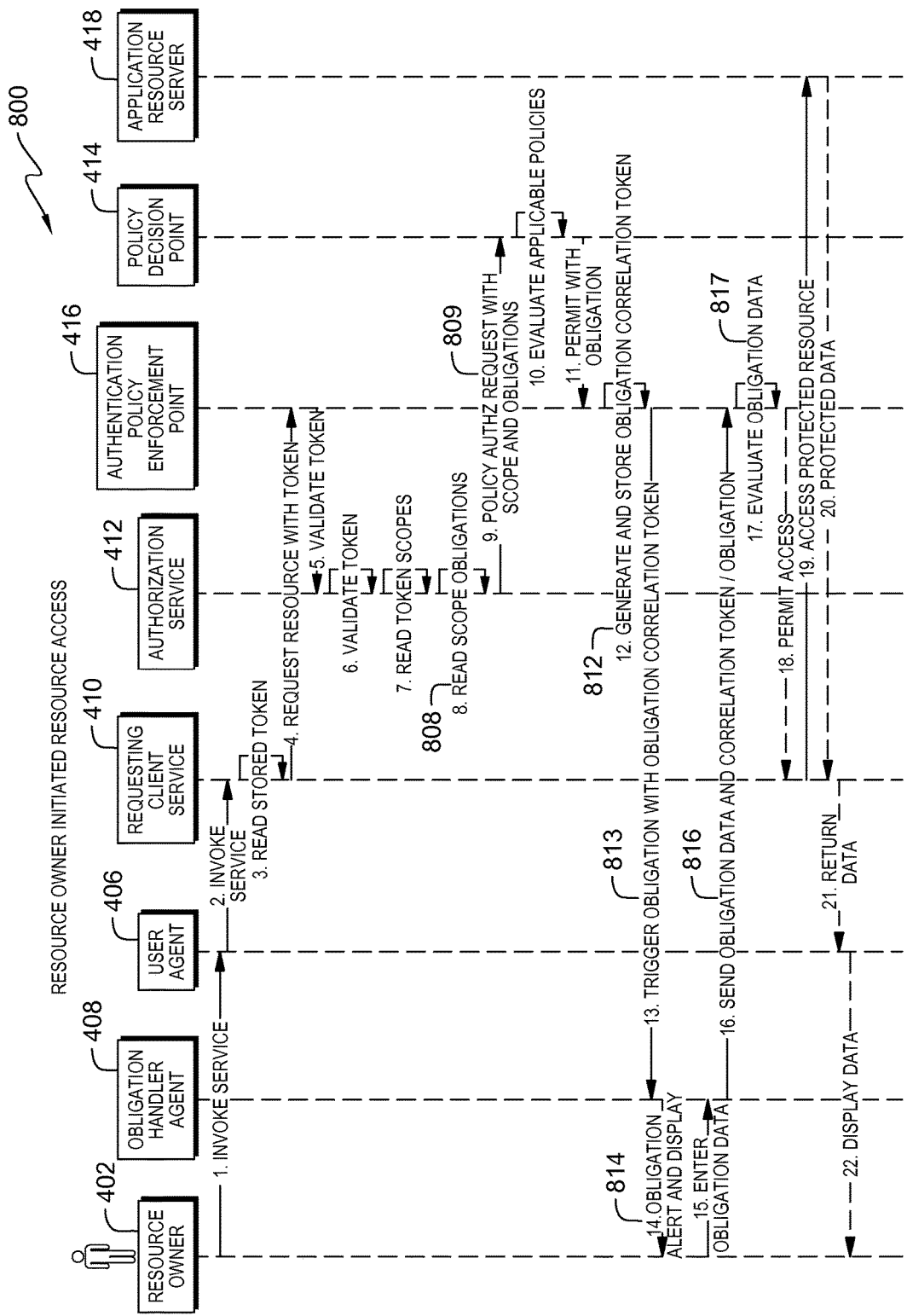
FIG. 8 is a flowchart of a fourth embodiment of a method according to the present invention.

Flowchart 800 of FIG. 8 shows components and flows in some embodiments of the present invention, including: resource owner 402; user agent 406; obligation handler agent 408; requesting client service 410; authorization service 412; policy decision point 414; authentication policy enforcement point 416; application resource server 418; and flows 808, 809, 812, 813, 814, 816, and 817.

Flowchart 800 of FIG. 8 shows enforcement of scope specific obligation policy 426 (not shown, refer to FIG. 4 above) during a resource access attempt that is initiated by resource owner 402 using an access token (not shown), in some embodiments of the present invention. The flow is initiated by resource owner 402 via requesting client service 410 that is in possession of an authorized access token (not shown).

The flows and sequence for an access attempt that is initiated by resource owner 402 are very similar to access initiated by requesting client service 410, as shown in flowchart 700 of FIG. 7. Noteworthy flows in FIG. 8 are discussed in the following paragraphs.

Flows 808 and 809: During token validation, authorization service 412 reads the scope specific obligation policy 426 (not shown, refer to FIG. 4) preferences (operation 808) associated with the authorization grant (not shown). Authorization service 412 includes the scope specific obligation policy 426 preferences in an authorization request sent to policy decision point 414 (operation 809).

Operation 812: Policy decision point 414 determines, and indicates, that an obligation must be completed. Policy decision point 414 invokes authentication policy enforcement point 416. Authentication policy enforcement point 416 generates a unique obligation correlation token (not shown) and stores it. The obligation correlation token is used to correlate an obligation response in operation 814.

Operation 813: Authentication policy enforcement point 416 sends an obligation notification (not shown) to obligation handler agent 408 of resource owner 402. The notification includes the obligation mechanism (not shown) and obligation correlation token (not shown). In some embodiments of the present invention, obligation handler agent 408 is an application on the resource owner 402's mobile device, and delivers the notification via a mobile push notification service.

Operation 816: Obligation handler agent 408 sends the obligation data (not shown) and obligation correlation token (not shown) the "/obligation" endpoint of authentication policy enforcement point 416.

Operation 817: The obligation data (not shown) is evaluated. In some instances, operation 817 invokes policy decision point 414 for validation.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Grant scope (or, more simply, "scope"): a set of limitation(s), condition(s) and/or restriction(s) on delegated access to delegator data by a delegatee; the set of conditions and/or restrictions may relate to aspects of delegated access including, but not necessarily limited to, the following: number of instances of delegated access (for example, one time access), limited time period during which delegated access may occur, limit on data volume of data that may be accessed, limit on speed and/or priority at which delegated access may occur, limits on further third party delegation by delegatee, limits on the manner in which delegatee may use delegator's data, limits based condition on delegator's use, or extent of use, of delegator's services, etc.; as "scope" is hereby defined for purposes of this document, a delegation grant to a portion of delegator data which is terminated only by an affirmative action on the part of the delegator (or not terminable at all), and which delegation grant is otherwise substantially unrestricted and unlimited does not have a "scope" as that term is used herein.

What is claimed is:

1. A method comprising:
sending, from an authorization server module over a communication network to a delegator device, a request for a first delegated authorization grant data set;
receiving, by the authorization server module over a communication network and from the delegator device, the first delegated authorization grant data set, with the first delegated authorization grant data set defining a scope of a first delegated authorization grant from the delegator device to a delegatee entity with respect to a first resource, with the first delegated authorization grant data set including: (i) a first scope variable value having been selected by a delegator entity through a delegation grant scope user interface on the delegator device, and (ii) a scope specific obligation policy;

modifying the first scope variable value by the delegator entity during a lifetime of the first delegated authorization grant, to produce a modified scope of the first delegated authorization grant;

modifying the scope specific obligation policy during the lifetime of the first delegated authorization grant, to produce a modified scope specific obligation policy; and controlling access to the first resource by the delegatee entity through the communication network in a manner limited by the modified scope of the first delegated authorization grant defined by the first delegated authorization grant data set;

wherein:
the request for a first delegated authorization grant data set includes a first obligation correlation token, and
the first delegated authorization grant data set includes the first obligation correlation token.

2. The method of claim 1 wherein the sending of the request for the first delegated authorization grant data set occurs at one of the following junctures: (i) before the delegatee seeks initial access to the first resource, (ii) each time the delegatee entity seeks to access the first resource, and (iii) at juncture(s) defined by the first delegation authorization grant.

3. The method of claim 1 wherein the first scope variable value relates to at least one of the following aspects of scope of a delegated authorization grant:
(i) whether a password is required; (ii) number of times a password can be used; (iii) time or date limit on access to the first resource; (iv) limit on amount of usage or rate of usage of the first resource; or (v) limit on usage of data derived from access of the resource subject to delegated authorization grant.

4. The method of claim 1 wherein the delegation grant scope user interface is incorporated into a first standard for delegated authorization grants from delegator entities to delegatee entities.

5. The method of claim 4 wherein the first standard is an open source standard.

6. The method of claim 1 further comprising:
storing the first delegated authorization grant data set, and the scope specific obligation policy, on the authorization server module.

7. The method of claim 1 further comprising:
evaluating, by a policy decision point module, resource owner scope specific obligation policy preferences.

8. The method of claim 1 further comprising:
receiving, by an obligation handler agent running on the delegator's device, the request for a first delegated authorization data set.

9. A computer program product comprising a computer readable storage medium that is not a transitory signal per se having stored thereon:
first program instructions programmed to send, from an authorization server module over a communication network to a delegator device, a request for a first delegated authorization grant data set;
second program instructions programmed to receive, by the authorization server module over a communication network and from the delegator device, the first delegated authorization grant data set, with the first delegated authorization grant data set defining a scope of a first delegated authorization grant from the delegator device to a delegatee entity with respect to a first resource, with the first delegated authorization grant data set including: (i) a first scope variable value having been selected by a delegator entity through a delegation grant scope user interface on the delegator device, and (ii) a scope specific obligation policy;

third program instructions programmed to modify the first scope variable value by the delegator entity during a lifetime of the first delegated authorization grant, to produce a modified scope of the first delegated authorization grant;

fourth program instruction programmed to modify the scope specific obligation policy during the lifetime of the first delegated authorization grant, to produce a modified scope specific obligation policy; and fifth program instructions programmed to control access to the first resource by the delegatee entity through the communication network in a manner limited by the modified scope of the first delegated authorization grant defined by the first delegated authorization grant data set;

wherein:
the request for a first delegated authorization grant data set includes a first obligation correlation token, and
the first delegated authorization grant data set includes the first obligation correlation token.

10. The product of claim 9 wherein the first program instructions are further programmed to send the request for the first delegated authorization grant data set at one of the following junctures: (i) before the delegatee seeks initial access to the first resource, (ii) each time the delegatee entity seeks to access the first resource, and (iii) at juncture(s) defined by the first delegation authorization grant.

11. The product of claim 9 wherein the first scope variable value relates to at least one of the following aspects of scope of a delegated authorization grant:
(i) whether a password is required; (ii) number of times a password can be used; (iii) time or date limit on access to the first resource; (iv) limit on amount of usage or rate of usage of the first resource; or (v) limit on usage of data derived from access of the resource subject to delegated authorization grant.

12. The product of claim 9 wherein the delegation grant scope user interface is incorporated into a first standard for delegated authorization grants from delegator entities to delegatee entities.

13. The product of claim 12 wherein the first standard is an open source standard.

14. A computer system comprising:
a processor(s) set; and
a computer readable storage medium that is not a transitory signal per se;
wherein:
the processor set is structured, located, connected or programmed to run program instructions stored on the computer readable storage medium; and
the program instructions include:
first program instructions programmed to send, from an authorization server module over a communication network to a delegator device, a request for a first delegated authorization grant data set,
second program instructions programmed to receive, by the authorization server module over a communication network and from the delegator device, the first delegated authorization grant data set, with the first delegated authorization grant data set defining a scope of a first delegated authorization grant from the delegator device to a delegatee entity with respect to a first resource, with the first delegated authorization grant data set including: (i) a first scope variable value having been selected by a delegator entity through a delegation grant scope user interface on the delegator device, and (ii) a scope specific obligation policy, third program instructions programmed to modify the first scope variable value by the delegator entity during a lifetime of the first delegated authorization grant, to produce a modified scope of the first delegated authorization grant, fourth program instruction programmed to modify the scope specific obligation policy during the lifetime of the first delegated authorization grant, to produce a modified scope specific obligation policy, and fifth program instructions programmed to control access to the first resource by the delegatee entity through the communication network in a manner limited by the modified scope of the first delegated authorization grant defined by the first delegated authorization grant data set;

wherein:

the request for a first delegated authorization grant data set includes a first obligation correlation token, and the first delegated authorization grant data set includes the first obligation correlation token.

15. The system of claim 14 wherein the first program instructions are further programmed to send the request for the first delegated authorization grant data set at one of the following junctures: (i) before the delegatee seeks initial access to the first resource, (ii) each time the delegatee entity seeks to access the first resource, and (iii) at juncture(s) defined by the first delegation authorization grant.

16. The system of claim 14 wherein the first scope variable value relates to at least one of the following aspects of scope of a delegated authorization grant:

(i) whether a password is required; (ii) number of times a password can be used; (iii) time or date limit on access to the first resource; (iv) limit on amount of usage or rate of usage of the first resource; or (v) limit on usage of data derived from access of the resource subject to delegated authorization grant.

17. The system of claim 14 wherein the delegation grant scope user interface is incorporated into a first standard for delegated authorization grants from delegator entities to delegatee entities.

18. The system of claim 17 wherein the first standard is an open source standard.

* * * * *